United States Patent Office 2,770,658
Patented Nov. 13, 1956

2,770,658

PROCESS FOR THE MANUFACTURE OF BENZENE HEXACHLORIDE

Ford R. Lowdermilk, Gwynedd Valley, and Everett A. Bruce, Paoli, Pa., assignors to The Pennsylvania Salt Manufacturing Company, Philadelphia, Pa., a corporation of Pennsylvania No Drawing. Application November 4, 1952, Serial No. 318,753

8 Claims. (Cl. 260—648)

This invention relates to processes for the removal and recovery of organic liquors adhering to benzene hexachloride solids.

Benzene hexachloride solids are important commercially in that the gamma isomer has insecticidal properties not possessed by the other isomers. The principal commercial processes for the manufacture of a gamma benzene hexachloride provide for the photochemical chlorination of benzene which produces the gamma isomer along with the alpha, beta, delta, epsilon, and other isomers of benzene hexachloride. The gamma isomer usually comprises 12 to 15% of the total benzene hexachloride produced in the chlorination process. Many processes have been devised to upgrade this gamma isomer concentration—the ultimate being the production of a substantially pure gamma material.

One of these processes for the production of a gamma-enriched benzene hexachloride is that of La Lande et al. as set forth in U. S. Patent 2,569,677. In this process benzene is chlorinated to the extent that a slurry is formed consisting of a liquid phase comprising benzene and dissolved benzene hexachloride isomers and a solid phase of undissolved benzene hexachloride isomers. The chlorination slurry upon filtration yields a benzene solution of benzene hexachloride high in gamma isomer content and a filter cake containing solid benzene hexachloride isomers consisting substantially of the alpha and beta isomers wet with the benzene solution of the dissolved isomers.

Another process that yields benzene hexachloride solids with adhering liquors is described in copending application Serial Number 136,408, filed December 31, 1949, now abandoned. In that process there is obtained a filter cake high in gamma isomer but containing some of the other isomers as part of the solids and also containing an adhering mother liquor consisting of either benzene or petroleum ether with dissolved benzene hexachloride isomers.

The usual practice in the industry heretofore, where a separation is made of benzene hexachloride solids from solvent solutions thereof, has been to wash the deliquored benzene hexachloride solids with portions of solvent free of dissolved benzene hexachloride isomers and usually at a low temperature in order to suppress solubility of benzene hexachloride with resulting partial displacement of the liquors adhering to the solids. The displacement of mother liquor is an important consideration in processes for upgrading gamma benzene hexachloride. Moreover, recovery of the mother liquor is important for economical process operation.

Repeated displacements of the residual liquor adhering to the benzene hexachloride solids are necessary when the mother liquor is very valuable and its dilution by the wash liquor does not adversely affect the economy of the operation. Thus, three or more displacement washes are considered normal in many industrial filtration operations. However, extensive dilution of liquors high in gamma isomer concentration is usually undesirable in most benzene hexachloride processes. Concurrently with the effect of dilution by the application of repeated solvent washes, the subsequent disposition of the deliquored benzene hexachloride solids must be considered in devising a practical benzene hexachloride solids washing and recovery process. In processes wherein the deliquored solids are further utilized in gamma benzene hexachloride manufacture, the problem of recovery of the washing solvent is not as important as its dilution effect on the mother liquor. In the processes wherein the benzene hexachloride solids are discarded or diverted to processes unrelated to gamma benzene hexachloride manufacture, the problem of the recovery of the displacement solvents or wash solvents is of considerable importance. In such cases the cost of the recovery operation of the solvent is compared with the value of the recovered solvent in determining the feasibility of the recovery operation.

We have now found a simple process for the removal and recovery of organic liquors adhering to benzene hexachloride solids which consists of washing the benzene hexachloride solids with an aqueous solution of an organic wetting agent at a temperature at which both the adhering solvent liquor and the wash water remain in the liquid state. This practice of the invention makes unnecessary the extensive application of displacement liquors with resultant dilution of the mother liquor where the wash liquor is the same as the mother liquor. In the preferred operation of our invention the benzene hexachloride solids, after a deliquoring operation, are first washed with a solvent to displace mother liquor and thereafter washed with an aqueous solution of an organic wetting agent, at a temperature at which both the organic liquor and the wash water remain liquid, to recover residual mother liquor and wash liquor.

This new invention is particularly applicable to the process of La Lande et al., supra. In this process the chlorination slurry is deliquored to produce benzene hexachloride solids consisting principally of the alpha and beta isomers and containing adhering benzene mother liquor wherein the gamma isomer content of the total dissolved solids is approximately 25 to 50%. Several washings of the alpha-beta solids with cold benzene leaves the residual solids wet with benzene to the extent of 10 to 13% of the total weight of the solids and in addition considerable amounts of the valuable gamma isomer are retained in the cake. This residual benzene and gamma benzene hexachloride is lost with the disposal or diversion of the unwanted alpha-beta cake from benzene hexachloride processes. Application of an aqueous solution of an organic wetting agent to the alpha-beta solids removes the residual benzene and gamma benzene hexachloride to the extent that their concentration in the final alpha and beta solids is less than 1% benzene and practically no gamma benzene hexachloride. After filtration, the benzene solution of benzene hexachloride is separated from the water, preferably by decantation and is combined with the gamma-enriched mother liquor of the chlorination process. Surprisingly, no dilution of the gamma isomer content has occurred through the washing and recovery process so that it can be combined with the mother liquor from the chlorination process. The separated wash water containing the wetting agent is reused in subsequent washings.

This invention is also of particular value in another process, namely a process for the production of pure gamma isomer benzene hexachloride. In the later stages of this process a filter cake of benzene hexachloride consisting substantially of gamma isomer and with minor proportions of other benzene hexachloride isomers and impurities is obtained. In accordance with our invention these solids are first washed with an organic solvent, which is then followed by a second wash with an aqueous solution of an organic wetting agent. This washing operation removes the minor proportion of the adulterating benzene hexachloride isomers and impurities in solution in the mother liquor and produces a benzene hexachloride solid of enhanced gamma isomer content.

In one form of our invention, which employs a solvent wash prior to the aqueous wash, the solvent washing liquid may be of the same identity as the mother liquor. This is of particular value in that another component is not added to the existing system. Advantageously, this washing liquor, of the same identity as the mother liquor, is preferably free of dissolved benzene hexachlorides. It is particularly advantageous when the washing solvent is also immiscible with water so that separation of the washing solvents and organic liquors from the subsequent aqueous wetting agent wash is readily effected by stratification. Organic liquors as used herein and throughout this application means organic solvents with or without dissolved benzene hexachloride solids therein, and may refer to either residual mother liquor or residual solvent wash liquor.

When using the term "washing" throughout this application, it is meant the processes wherein liquids are applied to solids to displace adhering liquors, followed by physical processes to separate the applied liquids from the solids. The wash liquor may be applied as a stream or as a spray to the benzene hexachloride solids and it is intended to include repulping processes wherein the benzene hexachloride solids are stirred with the wash solvent prior to deliquoring. The deliquoring operation may occur through the application of gravitational forces or through physical forces such as centrifugal force.

Of the many wetting agents useful in the practice of this invention, those from the classes designated as alkylated polyether alcohol and the sodium salts of sulphuric acid esters of saturated fatty alcohols having more than eight carbon atoms are particularly advantageous. Specific members of the above classes, which are particularly desirable in practicing our recovery processes, are Triton X 155 from the first class and sodium lauryl sulfate from the fatty alcohol sulfate class. This latter surface active agent is sold under the trade name of Duponol WA.

Other members of the fatty alcohol sulfate class which have been found useful are known under trade names as Maprofix and Wetanol. Another alkylated aryl polyether alcohol which is useful in practicing this invention is a compound wherein the alkyl group is an isooctyl radical, the aryl group is a phenol, and where the polyether alcohol group contains 12 to 16 condensed ethoxy groups. This is sold under the trade name of Triton X 100.

Other wetting agents found useful in practicing our invention are as follows: Nacconol—long-chain alkyl benzene sulfonate, Igepon AP and Igepon T—sulfonated amides, Aerosol OT—dioctyl ester of sodium sulfosuccinic acid, Aerosol MA—dihexyl ester of sodium sulfosuccinic acid, Armeens—fatty acid amines, Emulgor—polyhydric alcohol ether fatty acid condensate, Glycox, Kalavan, Polyethylene glyco-400 monostearate, Polyethylene glyco-400 monooleate, naphthalene 2,7 disulphonic acid, Glycox 2005, sodium oleate, and calcium phenol sulfonate.

The aqueous solutions of wetting agents wherein the concentration of the surface active agent is as low as 0.005% by weight have been found useful in practicing our inventiotn. Advantageously, the lower concentration limit of the surface active agent is 0.01% by weight. The maximum concentration of surface active agents useful in our process is determined by the solubility limitations of the surface active agents in water and by economic considerations. Thus, only solutions are useful in our process, and usually dilute solutions for the sake of economy.

The surface active agent is applied to the benzene hexachloride solids as an aqueous solution. Moreover, the temperature of the aqueous solution must be regulated so that the adhering organic liquor remains in the liquid phase throughout the washing cycle. If the aqueous solution of the surface active agent is too high in temperature, the adhering organic liquor will flash, thus depositing its dissolved solids in the benzene hexachloride solids. This flashing would defeat the purification purposes of the washing operations. It has been found particularly advantageous in practicing our invention to adjust the temperature of the aqueous solution of the wetting agent so that it remains within the range of 30° to 70° C. when applied to the benzene hexachloride solids.

The separation of the organic liquors from the aqueous solution of the organic wetting agent may be effected in any convenient manner. In the case where the organic liquor is immiscible with water, the separation process may be effected by stratification such as decantation or by the application of centrifugal forces. In those cases where the adhering organic liquors are miscible in the aqueous solution of the organic wetting agent, the separation may be effected by distillation and/or extraction processes.

The following examples are illustrative of the process of the invention:

Example I

A slurry consisting of 220 pounds of crystals of the alpha and beta isomers of benzene hexachloride suspended in a benzene mother liquor saturated with respect to all isomers of benzene hexachloride was filtered on a 40 gallon Nutsche type filter. The filter cake was then washed twice with 3 gallon portions of pure benzene. The filter cake after the benzene wash contained 12.9% benzene and 1.1% of gamma benzene hexachloride. The filtration and benzene washing operations were carried out at about 80° F. to 100° F.

The cake was then washed with 28 gallons of an aqueous solution of sodium lauryl sulfate (Duponol WA) in which the concentration of the sodium lauryl sulfate was 0.055% by weight. The temperature of the wash water was about 75° F. As filtrate 23 gallons of wetting agent solution were recovered in the aqueous layer while 27 pounds of organic material were recovered in the organic layer. The recovered organic layer contained 62.6% benzene and 14% of the gamma isomer of benzene hexachloride, the remainder being the other isomers of benzene hexachloride. After water washing the cake on the filter contained 5.9% benzene and no detectable gamma isomer of benzene hexachloride.

In contrast to this, a slurry consisting of 200 gm. of the alpha and beta isomers of benzene hexachloride and 200 gm. of mother liquor was subjected to filtration. The mother liquor in the slurry contained about 50% benzene and was saturated with respect to the alpha and beta isomers. The gamma isomer constituted about 36% of the benzene hexachloride content of the mother liquor.

After filtration tap water was then applied to the surface of the cake and vacuum applied to the filter flask. The wash water failed to penetrate the cake.

Example II 100 gm. of benzene was mixed with 200 gm. of benzene hexachloride which contained 88% of the gamma isomer. The mixture was heated to dissolve all the benzene hexachloride and then cooled to precipitate a crop of benzene hexachloride crystals. This cooled mixture was then filtered on a Buchner filter.

The wet cake resulting from this filtration was washed on the filter with 47 grams of benzene. The cake was then washed with 189 gm. of water containing about 0.08 gm. of Duponol WA. As a result of this water-washing operation about 5.8 gm. of benzene-benzene hexachloride solution was removed from the cake. The gamma isomer content of the cake prior to the water washing operation was about 98.8%. The gamma isomer content of the cake after the water washing operation was about 99.5%.

Example III

A mixture consisting of 300 gm. of dry alpha beta isomers of BHC and 300 gm. of benzene mother liquor was placed in a Buchner vacuum filter. The mother liquor contained about 50% benzene and 50% dissolved benzene hexachloride solids. The benzene hexachlorides in solution analyzed about 36% gamma isomer while the mother liquor was saturated with respect to the alpha and beta isomers of benzene hexachloride. Vacuum was applied to the filter and 188 gm. of mother liquor was recovered as filtrate. The moist filter cake was then repulped with 600 gm. of water containing 1½ gm. of Triton X 155 wetting agent and then refiltered on the Buchner funnel. After filtration the combined organic layer and water layer were placed in a separatory funnel for stratification.

Example IV

To illustrate operation at the higher temperatures, a slurry was made up consisting of 27 pounds benzene plus 38¼ pounds of the alpha and beta isomers of benzene hexachloride plus 1 pound of filter aid. This was filtered on a Nutsche type vacuum filter. The cake formed on the filter was washed once with 6¼ pounds of benzene. The benzene recovered in the filtrate at this point was about 18 pounds leaving about 15 pounds of benzene (about 45% of the total charge) remaining as adherent organic liquor in the filter cake. A wash consisting of 41¾ pounds of hot water containing about 0.04% wt. percent of Duponol was introduced to the benzene hexachloride solids on the filter. The water was applied at about 75° C., cooled immediately on contact to below 70° C., and cooled to 55° C. during the operation. The wash water penetrated the cake easily and displaced from the cake organic liquor containing 10 lb. 15 oz. of benzene. A trap filled with charcoal in the vacuum line from the filter adsorbed an additional 7 oz. of benzene. The total benzene removed from the cake by application of the hot aqueous wetting agent solution was thus 11 lb. 6 oz.

Operating as described in the above examples, the process can be applied to removal and recovery of other organic solvents commonly used in processes for upgrading the gamma isomer content of benzene hexachloride. Such solvents include toluene, xylenes, carbon tetrachloride, chloroform, petroleum hydrocarbons, such as the petroleum ethers and higher aliphatic hydrocarbons, cyclohexane and other cycloaliphatics, in general, solvents such as those listed in column 3 of U. S. Patent 2,438,900 and in U. S. Patent 2,502,258. It is also applicable to remove water soluble organic solvents from benzene hexachloride solids, for example recovering methanol, ethanol, isopropanol or other alcohol mother liquor (containing some dissolved gamma isomer) from the alpha and beta isomers and other benzene hexachlorides remaining as solids after extraction of gamma isomer from a total benzene chlorination product, or removal of acetic acid from an alpha-beta cake or other benzene hexachloride solids.

It will be obvious to one skilled in the art that each of the above examples may be operated employing any of the wetting agents listed above or equivalent surfactants known in the art.

We claim:

1. In a process for the recovery of a water immiscible organic liquor adhering to benzene hexachloride solids, the steps comprising washing the benzene hexachloride solids containing adhering water immiscible organic liquor with an aqueous solution of an organic wetting agent at a temperature at which both the water immiscible organic liquor and the wash water remain liquid, thereafter withdrawing a mixture of water immiscible organic liquor and the said aqueous solution of the organic wetting agent from contact with said solids and separating the said organic liquor from the said aqueous solution.

2. In a process for the recovery of water immiscible mother liquor and solvent wash liquor adhering to benzene hexachloride solids, the steps comprising washing the benzene hexachloride solids containing adhering water immiscible mother liquor with an organic liquid of the same identity as the mother liquor, thereafter washing the said benzene hexachloride solids with an aqueous solution of an organic wetting agent at a temperature at which both the water immiscible organic liquor and the wash water remain liquid, withdrawing a mixture of the said organic liquor and the said aqueous solution of the organic wetting agent from contact with said solids and separating the said organic liquor from the said aqueous solution.

3. In a process for the recovery of water immiscible organic liquor containing gamma-enriched benzene hexachloride adhering to benzene hexachloride solids consisting substantially of the alpha and beta isomers, the steps comprising washing the benzene hexachloride solids consisting substantially of the alpha and beta isomers and containing adhering water immiscible organic liquor with dissolved gamma isomer therein with an aqueous solution of an organic wetting agent at a temperature at which both the water immiscible organic liquid and the aqueous solution remain liquid, thereafter withdrawing a mixture of the said organic liquor and the aqueous solution of the said wetting agent from contact with said solids, and separating the recovered water immiscible organic liquor from the said aqueous solution of the organic wetting agent.

4. The process of claim 2 in which the organic wash solvent is benzene which is free of dissolved benzene hexachloride and washing of the benzene hexachloride solids with an aqueous solution of a wetting agent is performed at a temperature of 30 to 70° C.

5. In a process for enhancing the gamma isomer content of a benzene hexachloride filter cake consisting of a major proportion of gamma isomer and a minor proportion of other benzene hexachloride isomers and impurities and containing gamma enriched benzene hexachloride water immiscible liquor adhering to the said filter cake, the steps comprising washing the said benzene hexachloride filter cake with an aqueous solution of an organic wetting agent at a temperature at which both the water immiscible organic liquor and the said aqueous wash solution remain liquid, thereafter withdrawing a mixture of water immiscible organic liquor and aqueous wash solution of the said wetting agent from contact with said benzene hexachloride filter cake and separating the said organic liquor from the said aqueous wash solution.

6. In a process for the recovery of water immiscible organic liquor adhering to benzene hexachloride solids the steps comprising washing the benzene hexachloride solids containing adhering water immiscible organic liquor with an aqueous solution of an organic wetting agent selected from the class consisting of alkylated polyether alcohols, sodium salts of sulfuric acid esters of saturated fatty alcohols having in excess of 8 carbon atoms, long chain alkyl benzene sulfonates, sulfonated amides, alkyl esters of sodium sulfosuccinic acid, fatty acid amines, and polyhydric alcohol ether fatty acid condensates at a temperature at which both the water immiscible organic liquor and the said aqueous wash solution remain liquid, thereafter withdrawing a mixture of the said organic liquod and the said aqueous wash solution from contact with said solids, and separating the said organic liquor from the said aqueous wash solution.

7. The process of claim 6 in which the organic wetting agent is an alkylated polyether alcohol.

8. The process of claim 6 in which the organic wetting agent is the sodium salt of sulfuric acid esters of saturated fatty alcohols having in excess of 8 carbon atoms.

References Cited in the file of this patent

UNITED STATES PATENTS

| | | |
|---|---|---|
| 2,514,191 | Rowland et al. | July 4, 1950 |
| 2,569,677 | La Lande et al. | Oct. 2, 1951 |